(12) United States Patent
Balasubramani et al.

(10) Patent No.: US 9,686,223 B2
(45) Date of Patent: Jun. 20, 2017

(54) SYSTEM AND METHOD OF CREATING A NETWORK BASED DYNAMIC RESPONSE LIST

(71) Applicant: Honeywell International Inc., Morristown, NJ (US)

(72) Inventors: Sankar Balasubramani, Tamil Nadu (IN); B. Kamala Kannan, Tamil Nadu (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 29 days.

(21) Appl. No.: 14/044,155

(22) Filed: Oct. 2, 2013

(65) Prior Publication Data
US 2015/0095434 A1 Apr. 2, 2015

(51) Int. Cl.

| | |
|---|---|
| *G06F 15/16* | (2006.01) |
| *H04L 12/58* | (2006.01) |
| *G08B 13/02* | (2006.01) |
| *G06Q 50/00* | (2012.01) |
| *H04W 4/02* | (2009.01) |
| *H04L 29/08* | (2006.01) |
| *H04W 4/20* | (2009.01) |
| *G08B 25/00* | (2006.01) |
| *G08B 25/14* | (2006.01) |
| *H04W 4/12* | (2009.01) |
| *H04L 12/18* | (2006.01) |

(52) U.S. Cl.
CPC ............. *H04L 51/32* (2013.01); *G06Q 50/01* (2013.01); *G08B 13/02* (2013.01); *G08B 25/005* (2013.01); *G08B 25/14* (2013.01); *H04L 67/18* (2013.01); *H04L 67/306* (2013.01); *H04W 4/02* (2013.01); *H04W 4/206* (2013.01); *H04L 12/1895* (2013.01); *H04M 2242/30* (2013.01); *H04W 4/12* (2013.01)

(58) Field of Classification Search
USPC .................................................. 709/201–210
See application file for complete search history.

(56) References Cited

U.S. PATENT DOCUMENTS

| 8,520,072 B1* | 8/2013 | Slavin ............. G08B 13/19684 348/143 |
|---|---|---|
| 2008/0312946 A1* | 12/2008 | Valentine ............. G06Q 20/382 705/64 |
| 2009/0156160 A1* | 6/2009 | Evans ..................... H04W 4/04 455/404.2 |

(Continued)

FOREIGN PATENT DOCUMENTS

EP 0 429 364 A1 5/1991

OTHER PUBLICATIONS

Extended European search report from corresponding EP application 14184856.4, dated Jan. 30, 2015.

*Primary Examiner* — Liangche A Wang
(74) *Attorney, Agent, or Firm* — Husch Blackwell LLP

(57) ABSTRACT

A method and apparatus are provided that incorporate the steps of creating a friends list through a social networking site, a security system detecting an event within a secured area of the security system, the security system selecting at least one friend of the friends list based upon a relative geolocation of the at least one friend with respect to the secured area, and the security system sending an alert to the at least one friend notifying the at least one friend of the event.

12 Claims, 1 Drawing Sheet

(56) References Cited

U.S. PATENT DOCUMENTS

| | | | |
|---|---|---|---|
| 2011/0314084 A1* | 12/2011 | Saretto | G06F 17/30867 709/203 |
| 2012/0041907 A1* | 2/2012 | Wang | G06Q 30/02 706/12 |
| 2012/0150966 A1* | 6/2012 | Fan | G06Q 10/107 709/206 |
| 2014/0129605 A1* | 5/2014 | Huang | G06Q 30/0277 709/201 |

* cited by examiner

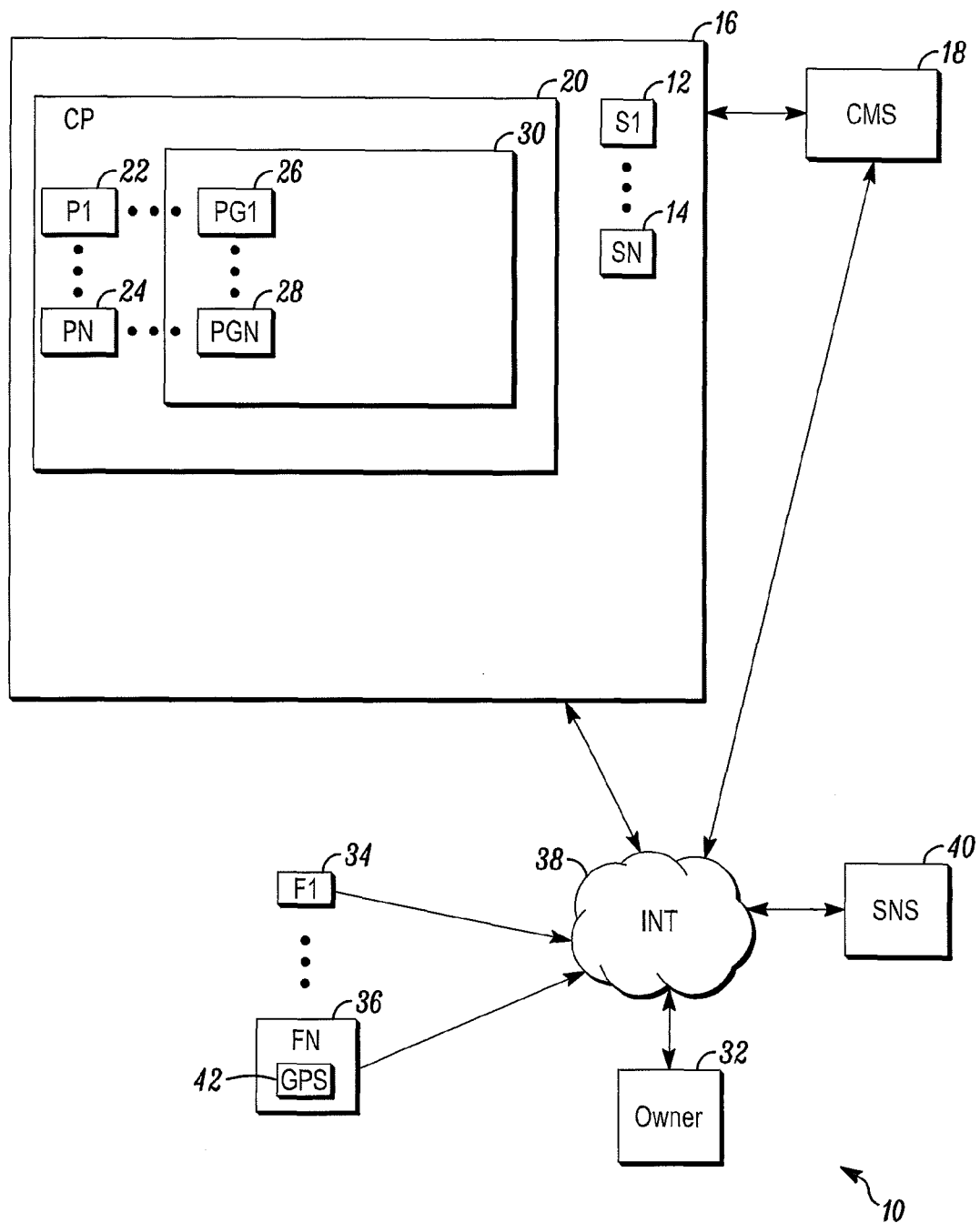

SYSTEM AND METHOD OF CREATING A NETWORK BASED DYNAMIC RESPONSE LIST

FIELD

The field relates to security systems and, more particularly, to the reporting of events detected by security systems.

BACKGROUND

Security systems are generally known. Such systems are typically used to protect assets and people within a secured area.

In the context of a home, a security system may include a control panel located near an entrance to the home and a sensor that is activated by an intruder passing through the entrance. Other sensors may be placed on secondary entrances and on the windows of the home. Still other sensors may be provided to detect fire, smoke, or carbon dioxide within the home.

In use, the owner of the home may arm the security system by entering a personal identification number (PIN) and arming key. The owner may arm the security system during periods when the owner is absent from the home or at night. If an intruder should activate a sensor on a door or window or a sensor should indicate a fire, then a controller of the security system may activate a local audible alarm. The controller may also send an alarm message to a central monitoring station. The central monitoring station may respond by summoning the police or fire department.

While security systems work well, the occurrence of an alarm may indicate an urgent need to contact the owner. For example, a break-in may require that the owner fix a door that has been forced open by an intruder. If not fixed, then the intruder may come back and cause further damage.

In the case where the owner is on vacation, it may be difficult to contact the owner. Accordingly, a need exists for better methods of contacting the owner or designee of the owner.

BRIEF DESCRIPTION OF THE DRAWING

FIG. 1 is a block diagram of a security system shown generally in accordance with an illustrated embodiment.

DETAILED DESCRIPTION OF AN ILLUSTRATED EMBODIMENT

While embodiments can take many different forms, specific embodiments thereof are shown in the drawings and will be described herein in detail with the understanding that the present disclosure is to be considered as an exemplification of the principles hereof as well as the best mode of practicing the same. No limitation to the specific embodiment illustrated is intended.

FIG. 1 is a block diagram of a security system 10 shown generally in accordance with an illustrated embodiment. Included within the security system may be one or more sensors 12, 14 used to detect threats to safety and security of a secured area 16. The sensors may include one or more limit switches that detect the opening of a door or window by an intruder. Alternatively, the sensors may also include one or more motion detectors placed within the interior of the secured area to detect intruders who have been able to defeat the perimeter sensors. As a still further alternative, the sensors may also include one or more environmental sensors (e.g., smoke, fire, carbon monoxide, etc.).

Included within the secured area may be a control panel 20 that monitors the sensors. Upon activation of one of the sensors, the control panel may send an alarm message to the central monitoring station 18. The central monitoring station may respond by summoning the appropriate civil authority (e.g., police, fire, etc.).

Included within the control panel may be one or more processor apparatuses (processors) 22, 24 each operating under control of one or more computer programs 26, 28 loaded from a non-transitory computer readable medium (memory) 30. As used herein, reference to a step performed by a computer program is also reference to the processor that executed that step.

In use, an alarm processor may monitor a status of each of the sensors. Upon activation of one of the sensors, the alarm processor may compose and send an alarm message to the central monitoring station.

The alarm processor may also send an alarm message to one person of a list of persons designated by the owner. In this regard, the owner working through a computer 32 may subscribe to a social networking site (e.g., Facebook) 40 through the Internet 38.

Through the social networking site, the user may designate a specific friends list for receiving alarm messages from the alarm processor of the security system. The friends list may be created using the normal rules and procedures available on the social networking site to create such a list. It will be assumed, of course, that the owner has permission from each person on the list to use his or her name and other information for this purpose.

Once the friends list has been created, the owner sends access information about this friends list to a notification processor of the security system. Access information, in this case, means a URL of the social networking website, an identifier of the owner, and any passwords necessary in order for the notification processor to retrieve information from the specific friends list.

Under the illustrated embodiment, the notification processor or a separate location processor uses the information from the friends list to determine a geographical location (geolocation) of each person on the friends list relative to the secured area. The location processor may order the persons within the list with the person closest to the secured area occupying the first location on the list, the next closest person to the secured area occupying the next location on the list, and so on.

In this regard, the location processor may determine the geolocation based upon the on-line presence of each person on this list. For example, if the person is accessing the social networking site from a desktop computer at home, then the location processor may use the person's home address as his/her geolocation. Alternatively, the location processor may access a global positioning system (GPS) 42 on the person's telephone 36 to determine the geolocation of the person.

In the event of activation of one of the sensors within the secured area, the alarm processor sends an alarm message to the central monitoring station and also to at least one of the people within the friends list based upon the geolocation of that person. In this regard, the notification processor may select people from the friends list one at a time based upon their location. For example, the person closest to the secured area may be selected first. Selecting the person closest to the secured area provides the least inconvenience should that person have to physically go to the location of the secured area to deal with some security problem (e.g., a break-in).

The alarm message to the selected person may be sent under any of a number of different formats (e.g., e-mail, instant message, prerecorded telephone message, etc.). If the selected person does not acknowledge the alarm message within a predetermined time period, then the notification processor notifies the next closest person to the secured area on the friends list.

In general, the system may include a security system that operates by executing the steps of creating a friends list through a social networking site, a security system detecting an event within a secured area of the security system, the security system selecting at least one friend of the friends list based upon a relative geolocation of the at least one friend with respect to the secured area, and the security system sending an alert to the at least one friend notifying the at least one friend of the event.

Alternatively, the system includes a friends list embodied as a file on a non-transitory computer readable medium on a social networking site, a security system that detects an event within a secured area of the security system, a processor of the security system that selects at least one friend of the friends list based upon a relative geolocation of the at least one friend with respect to the secured area, and a processor of the security system that sends an alert to the at least one friend notifying the at least one friend of the event.

In still another embodiment, the system incorporates an apparatus including a security system that detects an event within a secured area of the security system, a social networking website providing a friends list embodied as a file on a non-transitory computer readable medium, a processor of the security system that retrieves the friends list from the social networking website, a processor of the security system that determines a geographic location of each friend on the friends list, a processor of the security system that selects at least one friend of the friends list based upon a relative geographic location of the at least one friend with respect to the secured area, and a processor of the security system that sends an alert to the at least one friend notifying the at least one friend of the event.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

The invention claimed is:

1. A method comprising:
   creating a friends list through a social networking site, wherein the friends list includes a plurality of friends;
   a processor of a security system detecting an event within a secured geographic area of the security system, wherein the event includes an intruder opening a door or the intruder opening a window of the secured geographic area;
   the processor of the security system determining an on-line presence for each of the plurality of friends to create an on-line subset of the plurality of friends, wherein the online subset of the plurality of friends includes users accessing the social networking site at a time that the processor of the security system determines the on-line presence for each of the plurality of friends;
   the processor of the security system determining a respective geolocation for each of the on-line subset of the plurality of friends;
   the processor of the security system selecting a first friend of the on-line subset of the plurality of friends having the respective geolocation located nearest to the secured geographic area;
   the processor of the security system sending an alert to the first friend notifying the first friend of the event; and
   selecting and notifying a second friend of the plurality of friends when the first friend does not respond to the alert after a predetermined time period.

2. The method as in claim 1 wherein the alert comprises an e-mail message.

3. The method as in claim 1 wherein the alert comprises an instant message.

4. The method as in claim 1 further comprising the processor of the security system determining a respective distance from the respective geolocation of each of the on-line subset of the plurality of friends to the secured geographic area.

5. The method as in claim 4 wherein selecting the first friend of the on-line subset of the plurality of friends further comprises prioritizing the on-line subset of the plurality of friends based upon the respective distance from the respective geolocation of each of the on-line subset of the plurality of friends to the secured geographic area.

6. An apparatus comprising:
   a friends list embodied as a file on a non-transitory computer readable medium on a social networking site, wherein the friends list includes a plurality of friends; and
   a processor of a security system that detects an event within a secured geographic area of the security system, determines an on-line presence for each of the plurality of friends to create an on-line subset of the plurality of friends, determines a respective geolocation for each of the on-line subset of the plurality of friends, selects a first friend of the on-line subset of the plurality of friends having the respective geolocation located nearest to the secured geographic area, sends an alert to the first friend notifying the first friend of the event, and selects and notifies a second friend of the plurality of friends when the first friend fails to respond to the alert after a predetermined time period,
   wherein the online subset of the plurality of friends includes users accessing the social networking site at a time that the processor of the security system determines the on-line presence for each of the plurality of friends, and
   wherein the event includes at least an intruder opening a door or the intruder opening a window of the secured geographic area.

7. The apparatus as in claim 6 wherein the alert comprises an e-mail message.

8. The apparatus as in claim 6 wherein the alert comprises an instant message.

9. The apparatus as in claim 6 wherein the processor of the security system further determines a respective distance from the respective geolocation of each of the on-line subset of the plurality of friends to the secured geographic area.

10. The apparatus as in claim 9 wherein the processor of the security system prioritizes the on-line subset of the plurality of friends based upon the respective distance from the respective geolocation of each of the on-line subset of the plurality of friends to the secured geographic area.

11. An apparatus comprising:
a social networking website that provides a friends list embodied as a file on a non-transitory computer readable medium, wherein the friends list includes a plurality of friends; and
a processor of a security system that detects an event within a secured geographic area of the security system, retrieves the plurality of friends of the friends list from the social networking website, determines an on-line presence for each of the plurality of friends to create an on-line subset of the plurality of friends, determines a respective geographic location for each of the on-line subset of the plurality of friends, selects a first friend of the on-line subset of the plurality of friends having the respective geolocation located nearest to the secured geographic area, sends an alert to the first friend notifying the first friend of the event, and selects and notifies a second friend of the plurality of friends when the first friend fails to respond to the alert after a predetermined time period,
wherein the online subset of the plurality of friends includes users accessing the social networking website at a time that the processor of the security system determines the on-line presence for each of the plurality of friends, and
wherein the event includes at least an intruder opening a door or a window of the secured geographic area.

12. The apparatus as in claim 11 wherein the alert comprises one of an e-mail message and an instant message.

* * * * *